UNITED STATES PATENT OFFICE.

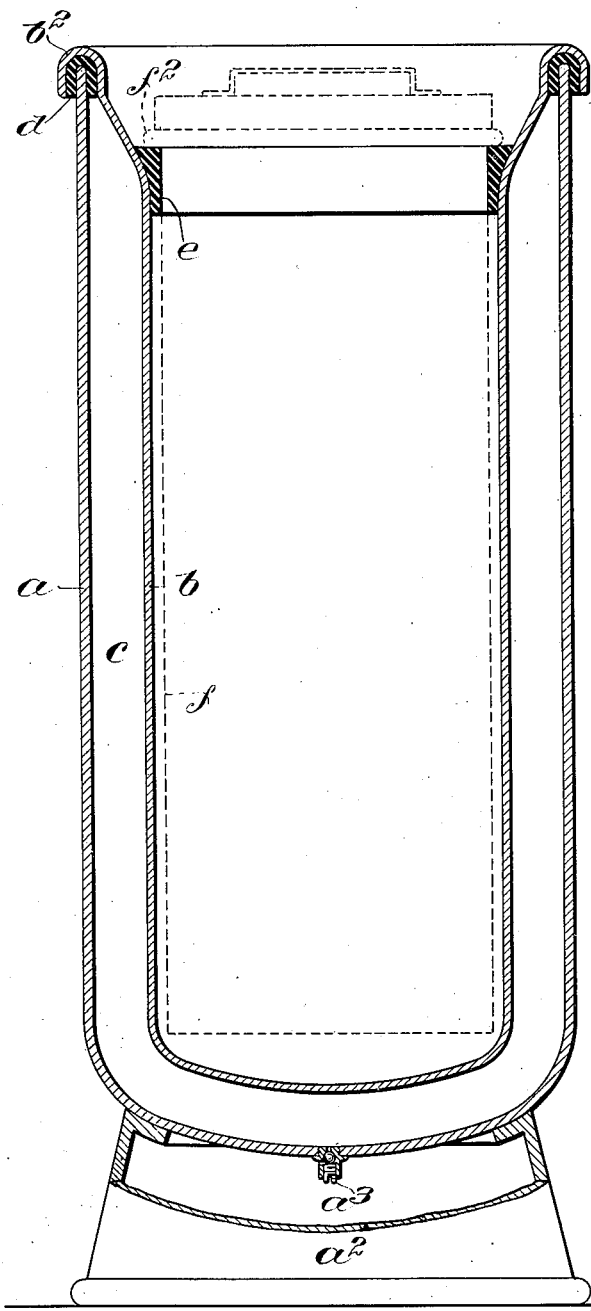

LUTHER W. PUFFER, OF MEDFORD, MASSACHUSETTS, ASSIGNOR TO PUFFER MANUFACTURING COMPANY, A CORPORATION OF MAINE.

INSULATING-RECEPTACLE.

999,672.  Specification of Letters Patent. Patented Aug. 1, 1911.

Application filed February 8, 1909. Serial No. 476,800.

*To all whom it may concern:*

Be it known that I, LUTHER W. PUFFER, a citizen of the United States, residing in Medford, in the county of Middlesex and State of Massachusetts, have invented an Improvement in Insulating-Receptacles, of which the following description, in connection with the accompanying drawings, is a specification, like letters on the drawings representing like parts.

The present invention relates to an insulating receptacle, the purpose of the insulation being to keep the contents at an even temperature.

The invention is embodied in a comparatively large receptacle, and is especially designed for use in connection with soda fountains where ice cream is kept in large quantities, it being customary to set cans containing cream into receptacles which are packed in ice.

It is the purpose of the present invention to obtain a receptacle of this kind adapted to receive the cans, the said receptacle being thoroughly insulated so that the cream is kept cold without ice, thereby decreasing the expense of maintenance, and also obviating the use of ice and the attendant trouble.

It is desirable in a large receptacle of this kind that it should be made of metal which is a comparatively good heat conductor, and, therefore, difficult of insulation.

In accordance with the invention, inner and outer shells are used, and the air is exhausted from the space between the shells, the partial vacuum thus affording the insulation. In order to prevent the conduction of heat from one shell to the other, the joint between the shells is provided with insulating material, that is to say, material which is a poor conductor of heat such, for example, as fiber, rubber or gutta-percha, whereby the two shells are kept entirely out of contact with each other. The construction is such that the two shells can be held together without fastening devices by making a substantially tight frictional joint, and relying upon the atmospheric pressure to keep the two shells from separating after the air has been exhausted from the space between them.

The drawing is a vertical section of a receptacle embodying the invention.

In the construction shown, the said receptacle consists of the outer shell $a$ and the inner shell $b$, the outer shell being shown as provided with a base or standard $a^2$ upon which the entire receptacle is supported. The inner shell $b$, which is of smaller diameter so as to afford a space $c$ between the shells, is joined to the outer shell at the top thereof by means of a tongue and channel connection, so that one shell overlaps the other. As herein shown, the inner shell $b$ is provided with a concave flange $b^2$ so that an annular channel is formed around the upper edge of the said receptacle $b$, the said channel being adapted to receive the upper edge of the receptacle $a$. The width of the channel is greater than the thickness of the wall of the receptacle $a$, so as to admit of the insertion of a lining $d$ of any suitable material which is a relatively poor conductor of heat, it being practicable to employ hard rubber, fiber, or similar substance. This insulating packing is arranged to conform to the channel and to the upper edge of the wall, so that when the two receptacles are forced together, it constitutes a substantially air tight fit, as well as a frictional joint. After the two receptacles are fitted together, the air is exhausted from the space $c$ in any suitable way, and the two shells are then firmly held together by means of the external atmospheric pressure. I have shown the external shell $a$ as provided with a ball valve at the lower end arranged to constitute a check while the air is being exhausted, the said valve then being permanently closed by means of a set screw $a^3$ which forces the ball of the valve against its seat and holds the same in position.

While the receptacle embodying the invention is capable of use in any connection where the temperature of the contents is to be maintained, I have shown the receptacle as especially adapted for use as a holder for cans, such, for example, as the ice cream cans in which the cream is supplied to the retailer. In this connection, I have shown the inner receptacle as provided with a collar $e$ which is also preferably of insulating material, such, for example, as fiber or hard rubber, the said collar being inserted in the neck of the receptacle and so shaped as to be supported by the outwardly sloping walls of the inner receptacle $b$. This affords an annular support for a flange $f^2$ at the upper end of the can $f$, shown in dotted lines, so that the said can, when delivered, may be set into the insulating receptacle, it being noted that the material of which the can is made is out of contact with the walls of the receptacle, and in fact entirely separated therefrom by the insulating collar $e$.

The receptacle can be provided with a cover of any suitable kind not herein shown, it being in fact not essential that it should be covered, since the greater part of the surface of the container within the receptacle is thoroughly insulated.

Claims.

1. An insulating receptacle comprising an outer shell; an inner shell of smaller diameter, the wall of said inner shell being inclined outward at the top to a diameter substantially equal to that of the outer shell; an inverted channel around the upper edge of the inner shell adapted to overlie the upper edge of the outer shell, and thereby afford a support for the inner shell, and a packing of material which is a poor conductor of heat contained in said channel between the shells.

2. An insulating receptacle comprising an outer shell; an inner shell of smaller diameter, the wall of said inner shell being inclined outward at the top to a diameter substantially equal to that of the outer shell; a channel formed around the edge of one of said shells to receive the edge of the other shell; a packing of material which is a poor conductor of heat contained in said channel; and a collar of material which is a poor conductor of heat contained in the upper part of the inner shell to afford a support for a receptacle smaller in diameter than said inner shell, substantially as described.

In testimony whereof, I have signed my name to this specification in the presence of two subscribing witnesses.

LUTHER W. PUFFER.

Witnesses:
SAMUEL D. GUILD,
JAS. J. MALONEY.